US008311549B2

(12) United States Patent
Chang et al.

(10) Patent No.: US 8,311,549 B2
(45) Date of Patent: Nov. 13, 2012

(54) WIRELESS MICROPHONE SYSTEM AND METHOD OF SIGNAL SYNCHRONIZATION THEREOF

(75) Inventors: Sheng-Hsiung Chang, Taipei County (TW); Sheng-Yuan Chang, Taipei County (TW)

(73) Assignee: Tawan Gomet Technology Co., Ltd., Taipei (TW)

( * ) Notice: Subject to any disclaimer, the term of this patent is extended or adjusted under 35 U.S.C. 154(b) by 569 days.

(21) Appl. No.: 12/607,290

(22) Filed: Oct. 28, 2009

(65) Prior Publication Data

US 2010/0113086 A1 May 6, 2010

Related U.S. Application Data

(60) Provisional application No. 61/109,517, filed on Oct. 30, 2008, provisional application No. 61/115,557, filed on Nov. 18, 2008.

(51) Int. Cl.
*H04W 40/00* (2009.01)

(52) U.S. Cl. ..................................... 455/448; 455/456.2

(58) Field of Classification Search .................. 455/448, 455/450, 455, 464, 456.2
See application file for complete search history.

(56) References Cited

U.S. PATENT DOCUMENTS

2005/0111484 A1* 5/2005 Obata ........................... 370/465
2007/0110023 A1* 5/2007 Bennett ......................... 370/350

* cited by examiner

*Primary Examiner* — Tu X Nguyen
(74) *Attorney, Agent, or Firm* — WPAT, P.C.; Anthony King

(57) ABSTRACT

The present invention discloses a wireless microphone system and a method of signal synchronization thereof, which comprises the following steps: receiving or transmitting a first channel wireless signal to at least one first wireless microphone through a first base station; receiving or transmitting a second channel wireless signal to at least one second wireless microphone through a second base station; and controlling a slave base station through a master base station, such that the first and the second channel wireless signals are synchronously received or transmitted. When any one of the base stations is not received a beacon for a duration of time, the base stations automatically switch to be the master base station and start to transmit the beacon. When other base stations receive the beacon, they switch back to be the slave base stations and use the received beacon as the basis of synchronization time correction.

20 Claims, 2 Drawing Sheets

WIRELESS MICROPHONE SYSTEM AND METHOD OF SIGNAL SYNCHRONIZATION THEREOF

BACKGROUND OF THE INVENTION

1. Field of the Invention

The present invention relates to a wireless microphone system; in particular, the present invention relates to a wireless microphone system for synchronously receiving/transmitting wireless signals and a method thereof.

2. Description of Related Art

At present, police patrol cars and fire-engines are commonly equipped with the vehicle audio/video recording system for evidence collections which may include an analog or digital bidirectional wireless microphone system consisting of a base station and a wireless microphone, in which the base station is installed on the police patrol car or the fire-engine, while the wireless microphone is carried by a policeman, for example, so the policeman is able to communicate with the base station located on the vehicle through the wireless microphone, thereby recording the dialogs with people and nearby sounds in a recording equipment during operations. In case of installing two or more wireless microphone systems operating at the same frequency band on a patrol car, since the distances between each base station and the wireless microphone carried by different policemen may vary, the intensity of the received radio frequency (RF) signal may be different as well. If the difference between the intensities of the several generated RF signals becomes excessively significant, the base station working on weaker signals, upon reception of a signal transferred by a remote microphone, may be interfered and blocked by the electromagnetic waves emitted from the base station on the car which transmits stronger signals and operates at the same frequency band but in a different channel; hence, the base station having weaker signal intensity may not successfully receive the wireless microphone signal pertaining to it, causing undesirable operation failure.

Under such a condition, among these base stations a synchronization mechanism is required, such that the two wireless microphone systems are allowed to transmit and to receive the wireless signal at the same time, thereby preventing the problem of asynchronous signal transmissions and receptions which leads to an undesirable aftermath of mutual interference, thus facilitating normal operations for both wireless microphones.

SUMMARY OF THE INVENTION

With regards to the aforementioned conventional problems, the objective of the present invention is to provide a wireless microphone system and a method of signal synchronization thereof in order to address to the issues of operational abnormalities in the wireless microphone system due to signal interferences when two or more wireless microphones operating at the same frequency band are simultaneously used in the same area or on the same vehicle.

First of all, several terms illustrated in the present disclosure are defined as below:

"Beacon": the signal sent from a master base station, used as the basis of synchronization time correction for all slave base stations.

"Beacon Period": the time interval for each beacon transmitted by the master base station.

"Duration of Beacon Reception": a mechanism in which at least one beacon transmitted by the master base station must be received by the slave base stations within a duration of the multiple of a fixed beacon period (e.g., within a duration of ten beacon periods), thereby confirming the existence of the master base station so as to prevent erroneous determination about beacon offline due to some temporary interferences.

"Wait-Time Parameter": a crash-proof mechanism which indicates, after the slave base stations confirm the beacon is offline (the duration of beacon reception is overdue), an interval of time from this moment of confirmation to the instant that other slave base stations start to actively transfer the beacon. Since the wait-time parameter determined by each base station may be different, when the duration of beacon reception becomes overdue, other slave base stations will not transmit the beacon at the same time which is allowed to eliminate the crash problem, thereby assuring that only one base station can become the master base station.

According to an objective of the present invention, a wireless microphone system is provided, comprising a first base station and a second base station or more. The first base station receives or transmits a first channel wireless signal to a first wireless microphone by a first channel. The second base station receives or transmits a second channel wireless signal to a second wireless microphone by a second channel, and between the first base station and the second base station (or else a third base station or more) a beacon may be transmitted or received in a wireless communication, or the beacon may be transmitted or received by a wired physical connection. In case that any one of the base stations does not received any beacon for a duration of beacon reception, the base stations automatically switch to be the master base stations, and the master base stations start to send the beacon. When other base stations receive such a beacon, they switch to be the slave base stations and use the received beacon as the basis of synchronization time correction. The master base station, in accordance with the beacon, controls the slave base station such that the first base station and the second base station (or some nearby base stations) synchronously receive and synchronously transmit the wireless signal.

Herein when the first base station transmits the beacon, the first base station is the master base station, and the second base station or other base station is the slave base station.

Herein the first base station and the second base station may respectively have a first ID and a second ID which may be an internal code, a production serial number or a random code etc., individually for the first base station and the second base station.

Herein the microphone system further comprises a calculation unit which respectively calculates a first wait-time parameter or a second wait-time parameter based on the first ID or the second ID.

Herein the first base station, as the slave base station, is initially in a reception state during the duration of beacon reception, awaiting any beacon probably transmitted by other base stations on air; suppose no beacon is received during the duration of beacon reception, it determines that the master base station is offline, and from this moment the first base station becomes the master base station and, when the duration of beacon reception is overdue, starts to actively send the beacon to other slave base stations for use.

Herein in case that the first base station receives a beacon sent from a certain base station during the duration of beacon reception, the first base station is a slave base station, and simply receives the beacon transferred from the master base station rather than sending any beacon during the duration of beacon reception, until no other beacon is received when the duration of beacon reception is overdue; by then, the abovesaid step of actively sending the beacon is repeated.

Herein, when the first wait-time parameter and the second wait-time parameter are equal, the first base station and second base station are both the master base station in which the first base station and second base station transmit the beacon at the same time; but since the transfer/reception time for each base station is identical, no conflicts of asynchronous transfer/reception occur.

However, when the system becomes asynchronous because that errors existing therein result in difference in beacon transfer times of the first base station and the second base station, then the base station with longer transfer time will receive the beacon from the base station with shorter transfer time before its beacon is transmitted, so the slower base station automatically acts as the slave base station and accepts the control from the master base station.

According to another objective of the present invention, a method of signal synchronization is provided, comprising the following steps: receiving or transmitting a first channel wireless signal to at least one first wireless microphone through a first base station by a first channel; receiving or transmitting a second channel wireless signal to at least one second wireless microphone through a second base station by a second channel; next, coupling the first base station and the second base station or more by a wired connection for transmitting or receiving a beacon; finally, controlling a slave base station through a master base station such that the first channel wireless signal on the first channel and the second channel wireless signal on the second channel are synchronously received or synchronously transmitted.

Herein, if none of the base stations receive the beacon in the ""Duration of Beacon Reception, one of the base station switches to be the master base station and the master base station starts to transmit the beacon; meanwhile, once the aforesaid beacon is received, the other base stations which are still in the wait-time switch to be the slave base stations.

Herein, the wireless synchronization signal is transmitted or received to all base stations installed on the vehicle through a physical "synchronous signal line", and one of the base stations acts as the master base station to transmit the high quality and stable synchronization beacon to other slave base stations via the synchronous signal line as the basis for correcting the transfer/reception time synchronization in other base stations.

The differences between wireless and wired synchronization operations lie in that:

A. the wireless synchronization operation is not limited to multiple wireless microphone systems installed on one single vehicle; when other patrol cars installed with the same wireless system approach within a range and the interference of asynchronous reception/transfer occurs, the base stations installed thereon automatically participate in such a synchronization mechanism, thus allowing only one master base station to transfer the synchronization beacon to the slave base stations located in other different cars, thereby eliminating the problem of mutual interference;

B. the wired synchronization operation can only allow the base stations mutually connected on the same vehicle with a view to providing the beacon efficiently and stably.

But the aforementioned two mechanisms may be individually applied, or employed in combination for conjunctive and complementary effects.

In summary of the above-illustrated descriptions, the wireless microphone system and the method of signal synchronization thereof provides one or more of the following advantages:

(1) the wireless microphone system and the method of signal synchronization thereof according to the present invention eliminates the occurrence of abnormal operations caused by wireless electromagnetic wave interferences in the wireless microphone systems working at the same frequency band;

(2) the wireless microphone system and the method of signal synchronization thereof according to the present invention allows to synchronously receive or synchronously transmit all wireless signals within a range by controlling the slave base station through the master base station;

(3) the wireless microphone system and the method of signal synchronization thereof according to the present invention enables prevention of mutual interference in wireless electromagnetic waves due to neighboring installations of base stations operating at two or more identical frequency bands;

(4) the use of wired or wireless synchronization mechanisms can be individually applied, or otherwise employed in combination for conjunctive and complementary effects.

DETAILED DESCRIPTION OF THE PREFERRED EMBODIMENTS

In the following embodiments, installation of two base stations on one police patrol car is taken as an example for the purpose of illustration; but in practice, the number of the base station is by no means limited to two.

First of all, several terms illustrated in the present disclosure are defined as below:

"Beacon": the signal sent from a master base station, used as the basis of synchronization time correction for all slave base stations.

"Beacon Period": the time interval for each beacon transmitted by the master base station.

"Duration of Beacon Reception": a mechanism in which at least one beacon transmitted by the master base station must be received by the slave base stations within a duration of the multiple of a fixed beacon period (e.g., within a duration of ten beacon periods), thereby confirming the existence of the master base station so as to prevent erroneous determination about beacon offline due to some temporary interferences.

"Wait-Time Parameter": a crash-proof mechanism which indicates, after the slave base stations confirm the beacon is offline (the "Duration of Beacon Reception" is overdue), an interval of time from this moment of confirmation to the instant that other slave base stations start to actively transfer the beacon. Since the "Wait-Time Parameter" determined by each base station may be different, when the "Duration of Beacon Reception" becomes overdue, other slave base stations will not transmit the beacon at the same time which is allowed to eliminate the crash problem, thereby assuring that only one base station can become the master base station.

Figure 1:
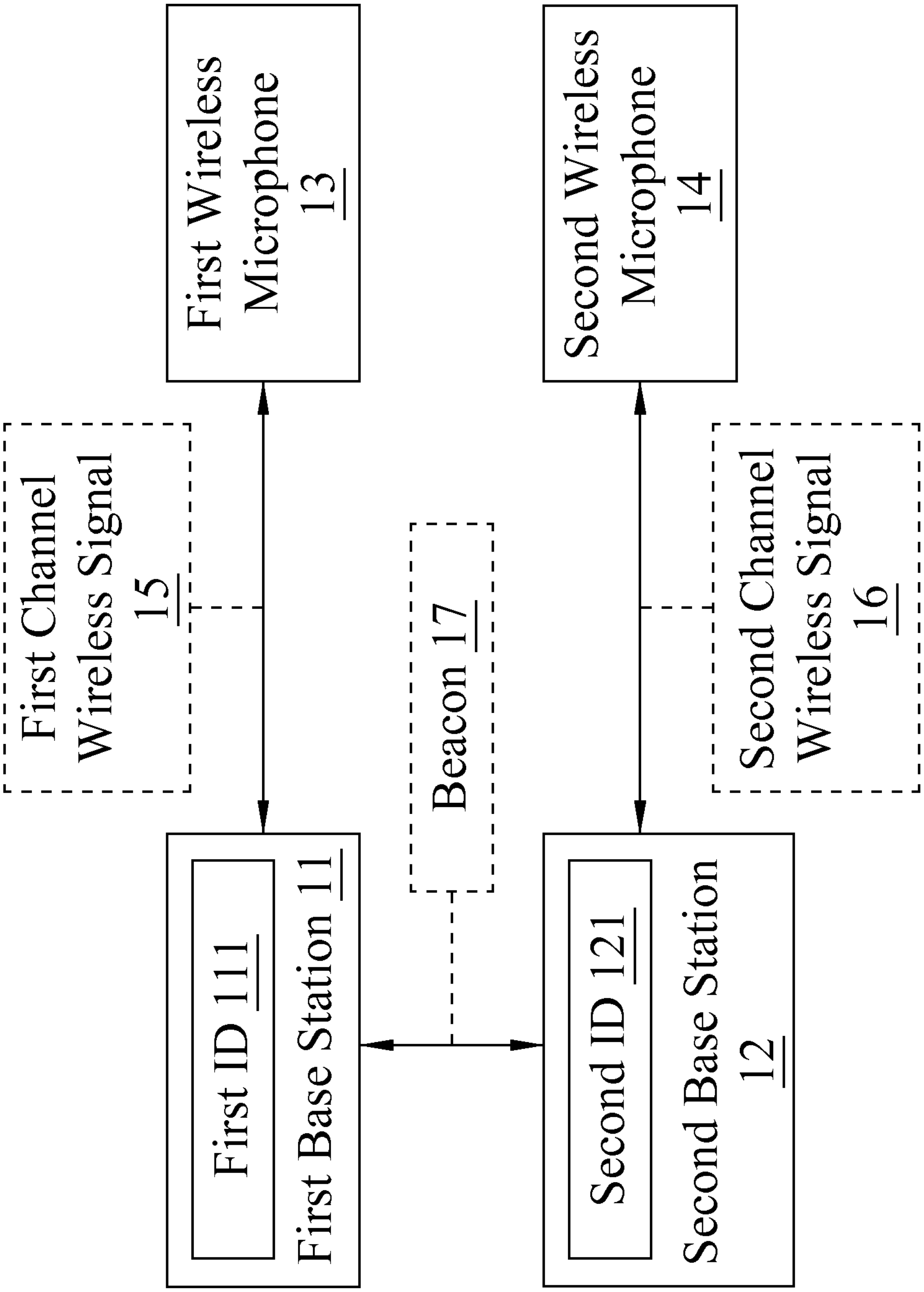
FIG. 1 is a diagram of the wireless microphone system according to the present invention.

Refer now to FIG. 1, wherein a diagram of the wireless microphone system according to the present invention is shown. In the Figure, the wireless microphone system 1 comprises a first base station 11, a second base station 12, a first wireless microphone 13 and a second wireless microphone 14. The first base station 11 receives or transmits a first channel wireless signal 15 to the first wireless microphone 13 by the first channel, while the second base station 12 receives or transmits a second channel wireless signal 16 to the second wireless microphone 14 by the second channel. The first base station 11 and the second base station 12 may transmit or receive the beacon 17 in a wireless communication or a wired physical connection, wherein the wireless communication may be accomplished by means of a radio frequency module, and the wired physical connection may be done through a synchronization signal line. The first base station 11 may transmit the beacon 17 to the second base station 12 or more base stations at a fixed time (beacon period), and the second base station 12 is also allowed to transmit the beacon 17 to the first base station 11 as well as other base stations, so it is able to determine that whether the first base station or the second base station is the master base station or the slave base station respectively in accordance with the transfer or reception of the beacon 17.

When the beacon 17 is transmitted from the first base station 11 to the second base station 12, the first base station 11 is determined as the master base station and the second base station 12 as the slave base station. Therefore, the first base station 11 may consistently transmit the beacon 17 to the second base station 12, while the second base station 12 may continuously receive the beacon 17 as well, in this way the first wireless signal 15 and the second wireless signal 16 may be appropriately adjusted for synchronous reception or synchronous transfer based on the beacon 17 Similarly, when the beacon 17 is transferred from the second base station 12 to the first base station 11, the second base station 12 is determined as the master base station and the first base station 11 as the slave base station. Consequently, the second base station 12 may consistently transfer the beacon 17 to the first base station 11, and the first base station 11 may continuously receive the beacon 17 from the second base station 12 as well, so the effect of synchronous signal reception or synchronous signal transmission may be also achieved.

Each base station has a different "wait-time parameter" for beacon transfer or reception, and such a parameter may be generated with various methods. The example set forth hereunder is simply one among others; in the example, a machine identification code (or production serial number) is used as a constant which is applied in a mathematical formula, and the value thus generated may be used as the "wait-time parameter" of each base station for transmitting the beacon 17.

The first base station 11 has a first ID 111, and the second base station 12 has a second ID 121. The first ID 111 and the second ID 121 may be different ID's, such that the first base station 11 and the second base station 12 have different wait-time parameters. Herein the system uses a calculation unit to convert the first ID 111 and the second ID 121 into a first wait-time parameter and a second wait-time parameter, and such the first wait-time parameter and the second wait-time parameter may act as the prefix time parameter for the transfer of the beacon 17.

In case the first base station 11 does not receive any beacon 17 from other base stations for the "duration of beacon reception", the first base station 11 switches from the slave base station to be the master base station so as to transfer the beacon 17 to the second base station 12. Similarly, suppose the second base station 12 does not receive any beacon 17 sent from other base stations for the "duration of beacon reception", the second base station 12 switches from the slave base station to be the master base station thereby transferring the beacon 17 to other base stations. As a result, before transferring the beacon 17, the first base station 11 or the second base station 12 needs to be in a reception state so as to receive the beacon 17.

For example, both base stations start up at the same time; suppose the wait-time parameter of the first base station 11 is 0.1 second and the wait-time parameter of the second base station 11 is 0.2 second, with a beacon period of 1 second, and the first base station 11 does not received any beacon 17 for a 10-second "Duration of Beacon Reception" equal to ten beacon periods, the first base station 11 switches to be the master base station, waiting for 0.1 second and then starting to transfer the beacon 17 to other base stations. At this moment, the second base station 12, after such "Duration of Beacon Reception", is also ready to switch to be the master base station; however, since the "Wait-Time Parameter" thereof is 0.2 second, before transferring the beacon 17, it receives the beacon 17 from the first base station 11, thus automatically switching to be the slave base station. Due to different time parameters in the first base station 11 and the second base station 12, the first base station 11 and the second base station 12 will not transfer the beacon 17 at the same moment. Furthermore, when a base station has a smaller ID, its "Wait-Time Parameter" becomes shorter, and the possibility of becoming the master base station is accordingly higher.

Occasionally, after the operations of the calculation unit, the first base station 11 and the second base station 12 may also possibly have the same "Wait-Time Parameter", or else the difference in startup time may happen to cause the first base station 11 and the second base station 12 to transfer the beacon 17 at the same instant; under such a situation, the first base station 11 and the second base station 12 both become the master base station. Whereas since the first base station 11 and the second base station 12 both transfer the beacon 17 simultaneously and no time difference exists, asynchronous phenomenon will not occur. Still, after long-term operations, it is nonetheless possible to generate errors in beacon transfer times due to variations in system elements or other factors, and in this case, the slower base station will receive the beacon 17 from the other base station and switch itself to be the slave base station.

For example, when the first base station 11 receives the beacon 17 from the second base station 12 beforehand, the first base station 11 switches to be the slave base station, but the second base station 12 remains the master base station in order to continuously send the beacon 17. For the same reason, in case the second base station 12 receives the beacon 17 from the first base station 11 earlier, then the second base station 12 switches itself to be the slave base station and the first base station 11 remains its status of master base station thereby continuously transfer the beacon 17.

The system may also comprises a third base station or more, so the system may use the calculation unit to calculate the ID in order to determine which base station is entitled as the master base station. Suppose the first base station 11 has a shorter ID, accordingly a smaller "Wait-Time Parameter", the first base station 11 may act as the master base station, whereas the second base station 12 and the third base station become the slave base stations. In case the first base station 11 stops transferring the beacon 17 owing to shutdown, interference, out of the wireless application range or any other possible causes, thus the second base station 12 and the third base station do not receive any beacon 17 for the "Duration of Beacon Reception", the base station having a smaller "Wait-Time Parameter" may start to send the beacon 17 to create a new master base station in order to replace the previous master base station. Therefore, there exists only one master base station in the system to guide other slave base stations, thereby assuring normal operations in the wireless microphone system.

Figure 2:
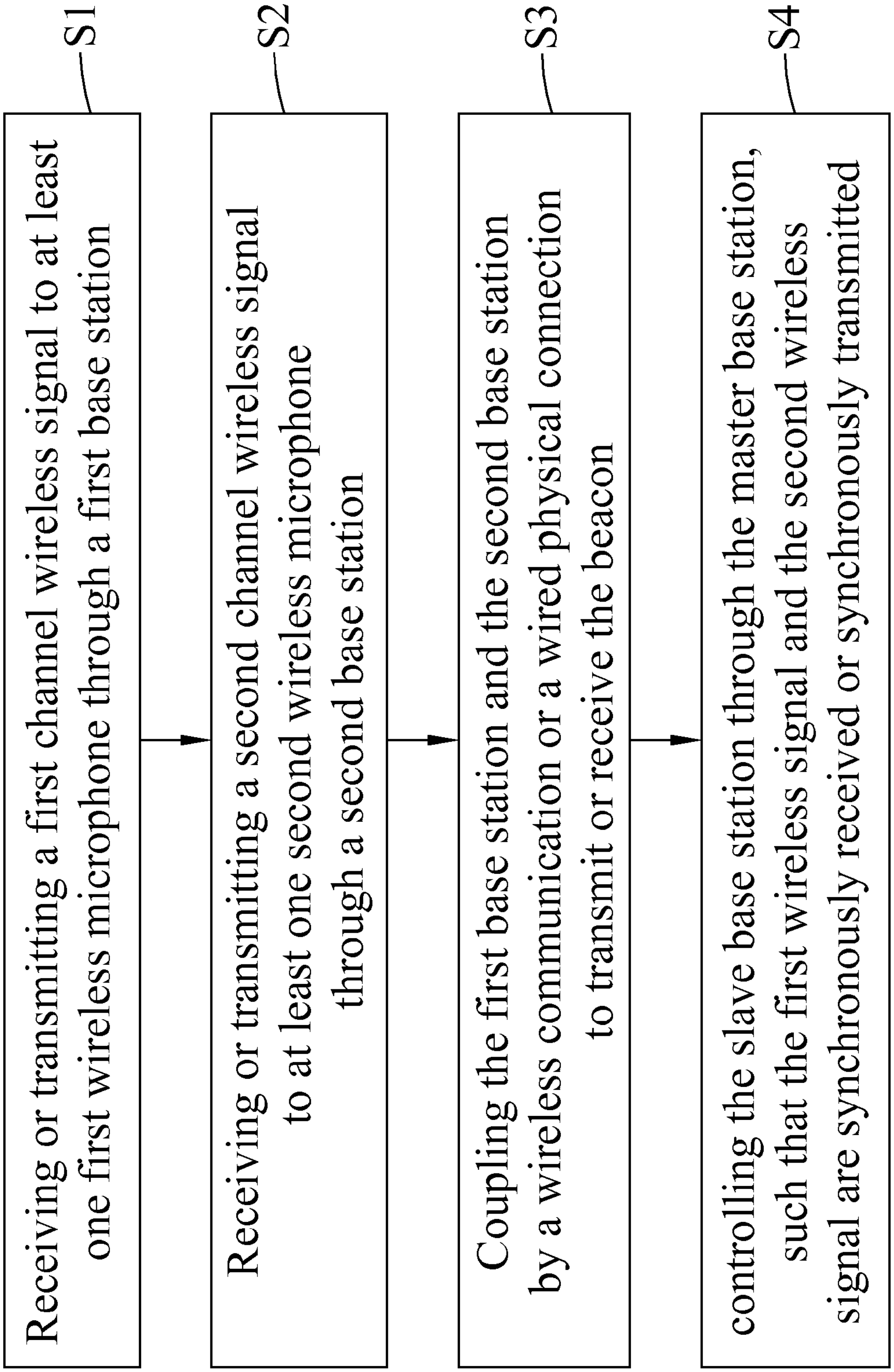
FIG. 2 is a flowchart for the method of signal synchronization for the wireless microphone according to the present invention.

Refer now to FIG. 2, wherein a flowchart for the signal synchronization method of the wireless microphone according to the present invention is shown, comprising the following steps: at Step S1, receiving or transmitting a first channel wireless signal to at least one first wireless microphone through a first base station by a first channel; at step S2, receiving or transmitting a second channel wireless signal to at least one second wireless microphone through a second base station by a second channel; at step S3, coupling the first base station and the second base station by a wireless communication or a wired physical connection for transmitting or receiving the beacon; at step S4, controlling the slave base station through the master base station, such that the first channel wireless signal and the second channel wireless signal are synchronously received or synchronously transmitted; wherein when no beacon is received by the first base station and the second base station, the first base station or the second base station switches to be the master base station, thus the first base station or the second base station starts to transfer the beacon, and upon reception of the beacon by the first base station or the second base station, the first base station or the second base station becomes the slave base station to receive the beacon. Wherein when the beacon is received by the first base station and the second base station, the first base station and the second base station switch to be the slave base stations.

The aforementioned descriptions are simply illustrative, rather than being restrictive. All effectively equivalent modifications, changes or substitutions made thereto without departing from the spirit and scope of the present invention are deemed as being included by the claims set forth hereunder.

What is claimed is:

1. A wireless microphone system, comprising:

a first base station receiving or transmitting a first channel wireless signal to at least one first wireless microphone by a first channel; and a second base station receiving or transmitting a second channel wireless signal to at least one second wireless microphone by a second channel, and the first base station and the second base station are coupled by a wireless communication or a wired physical connection for transmitting or receiving a beacon;

wherein when no beacon is received within a predetermined period by the first base station and the second base station, the first base station or the second base station switches to be a master base station and the master base station transmits the beacon;

wherein when the beacon is received by the first base station and the second base station, the first base station and the second base station switch to be slave base stations, and the master base station controls the slave base stations in accordance with the beacon such the first channel wireless signal and the second channel wireless signal are synchronously received or synchronously transmitted.

2. The wireless microphone system according to claim 1, wherein when the first base station transmits the beacon, the first base station is the master base station, and the second base station and other base stations are the slave base stations.

3. The wireless microphone system according to claim 1, wherein the wired physical connection is mutually coupled by means of a synchronous signal line.

4. The wireless microphone system according to claim 1, wherein the first base station and the second base station respectively have a first ID and a second ID.

5. The wireless microphone system according to claim 4, wherein the first ID and the second ID are internal codes of the first base station and the second base station respectively or production serial numbers of the first base station and the second base station respectively.

6. The wireless microphone system according to claim 4, further comprising a calculation unit, the calculation unit calculates a first wait-time parameter or a second wait-time parameter respectively in accordance with the first ID or the second ID for the first base station or the second base station to wait before receiving the beacon.

7. The wireless microphone system according to claim 6, wherein when the first base station does not receive the beacon during a duration corresponding to the first wait-time parameter, the first base station switches to be the master base station and transmits the beacon to the second base station.

8. The wireless microphone system according to claim 6, wherein when the first base station receives the beacon during a duration corresponding to the first wait-time parameter, the first base station switches to be the slave base station and dose not transmit the beacon.

9. The wireless microphone system according to claim 6, wherein when the first wait-time parameter is equal to the second wait-time parameter and the startup time is identical, or the first wait-time parameter is not equal to the second wait-time parameter and the startup time is different, causing the first base station and the second base station transmit the beacon simultaneously, the first base station and the second base station both become the master base station at the same time.

10. The wireless microphone system according to claim 9, wherein when the first base station and the second base station transmit the beacon asynchronously due to errors in the system, the first base station or the second base station receives the beacon and the first base station or the second base station switches to be the slave base station.

11. A method of signal synchronization for a wireless microphone, comprising the following steps:

receiving or transmitting a first channel wireless signal to at least one first wireless microphone through a first base station by a first channel;

receiving or transmitting a second channel wireless signal to at least one second wireless microphone through a second base station by a second channel;

coupling the first base station and the second base station by a wireless communication or a wired physical connection for transmitting or receiving a beacon;

controlling a slave base station through a master base station, such that the first channel wireless signal and the second channel wireless signal are synchronously received or synchronously transmitted;

wherein when no beacon is received within a predetermined period by the first base station and the second base station, the first base station or the second base station switches to be the master base station, thus the master base station starts to transmit the beacon;

wherein when the beacon is received by the first base station and the second base station, the first base station and the second base station switch to be the slave base stations.

12. The method of signal synchronization for a wireless microphone according to claim 11, wherein when the first base station transmits the beacon, the first base station is the master base station and the second base station is the slave base station.

13. The method of signal synchronization for a wireless microphone according to claim 11, wherein the wired physical connection is mutually coupled by means of a synchronous signal line.

14. The method of signal synchronization for a wireless microphone according to claim 11, wherein the first base station and the second base station respectively has a first ID and a second ID.

15. The method of signal synchronization for a wireless microphone according to claim 14, wherein the first ID and the second ID are respectively the internal codes of the first base station and the second base station respectively or production serial number of the first base station and the second base station respectively.

16. The method of signal synchronization for a wireless microphone according to claim 14, further comprising a step of calculating a first wait-time parameter or a second wait-time parameter respectively in accordance with the first ID or the second ID for the first base station or the second base station to wait before receiving the beacon.

17. The method of signal synchronization for a wireless microphone according to claim 16, wherein when the first base station does not receive the beacon during a duration corresponding to the first wait-time parameter, the first base station switches to be the master base station and transmits the beacon to the second base station.

18. The method of signal synchronization for a wireless microphone according to claim 16, wherein when the first base station does receive the beacon during a duration corresponding to the first wait-time parameter, the first base station switches to be the slave base station and dose not transmit the beacon.

19. The method of signal synchronization for a wireless microphone according to claim 16, wherein when the first wait-time parameter is equal to the second wait-time parameter and the startup time is identical, or the first wait-time parameter is not equal to the second wait-time parameter and the startup time is different, causing the first base station and the second base station transmit the beacon simultaneously, the first base station and the second base station both become the master base station at the same time.

20. The method of signal synchronization for a wireless microphone according to claim 19, wherein when the first base station and the second base station transmit the beacon asynchronously due to errors in the system, the first base station or the second base station receives the beacon and the first base station or the second base station switches to be the slave base station.

* * * * *